(12) United States Patent
Kamm et al.

(10) Patent No.: US 8,172,065 B2
(45) Date of Patent: May 8, 2012

(54) BEARING ASSEMBLY

(75) Inventors: Sandra Kamm, Gochsheim (DE); Peter Horling, Schonungen (DE); Armin Olschewski, Schweinfurt (DE); Edgar Pickel, Sommerach (DE)

(73) Assignee: Aktiebolaget SKF, Göetborg (SE)

( * ) Notice: Subject to any disclaimer, the term of this patent is extended or adjusted under 35 U.S.C. 154(b) by 133 days.

(21) Appl. No.: 12/794,360

(22) Filed: Jun. 4, 2010

(65) Prior Publication Data
US 2010/0326788 A1 Dec. 30, 2010

(30) Foreign Application Priority Data
Jun. 6, 2009 (DE) .......................... 10 2009 024 093

(51) Int. Cl.
*B65G 13/00* (2006.01)
(52) U.S. Cl. .......................... 193/37; 384/489
(58) Field of Classification Search .................. 198/780, 198/788, 789, 790; 193/37; 384/480, 489, 384/490
See application file for complete search history.

(56) References Cited

U.S. PATENT DOCUMENTS

| | | | | |
|---|---|---|---|---|
| 2,757,988 A * | 8/1956 | Lecourbe | ........................ | 193/37 |
| 3,160,265 A * | 12/1964 | Hagenbook | .................. | 198/765 |
| 3,362,760 A * | 1/1968 | Sernetz | ........................ | 384/480 |
| 3,957,147 A * | 5/1976 | Specht | ............................ | 193/37 |
| 4,181,217 A * | 1/1980 | Huls et al. | ....................... | 193/37 |
| 4,339,158 A * | 7/1982 | Greener et al. | ................ | 384/489 |
| 4,668,110 A * | 5/1987 | Égető et al. | ..................... | 193/37 |
| 5,160,238 A * | 11/1992 | Kambara | ...................... | 384/556 |
| 2007/0261933 A1 * | 11/2007 | Scott | .............................. | 193/37 |

FOREIGN PATENT DOCUMENTS

| | | |
|---|---|---|
| DE | 1738837 U | 1/1957 |
| DE | AT215887 B | 6/1961 |
| DE | 1868673 U | 3/1963 |
| DE | 2311864 A1 | 9/1973 |
| DE | 2400701 A1 | 7/1974 |
| DE | 2801879 A1 | 11/1978 |
| DE | 10303981 A1 | 8/2004 |
| DE | 60206221 T2 | 7/2006 |
| DE | 102007060968 A1 | 7/2008 |
| EP | 1275862 A1 | 1/2003 |
| GB | 592043 A | 9/1947 |
| GB | 1589904 A | 5/1981 |

* cited by examiner

*Primary Examiner* — James R Bidwell
(74) *Attorney, Agent, or Firm* — Mark A. Ussai; Bryan Peckjian

(57) ABSTRACT

A bearing assembly (1) includes at least one bearing (3) that rotatably supports a cylindrical roller tube (2). A cushioning layer (5) is disposed, directly or indirectly, between a ring (4) of the bearing (3) and the cylindrical roller tube (2). At least one contact surface (6, 7) for the cushioning layer (5) extends over a defined axial distance (L) at an angle (α) to the rotational axis (A) of the bearing assembly (1).

18 Claims, 6 Drawing Sheets

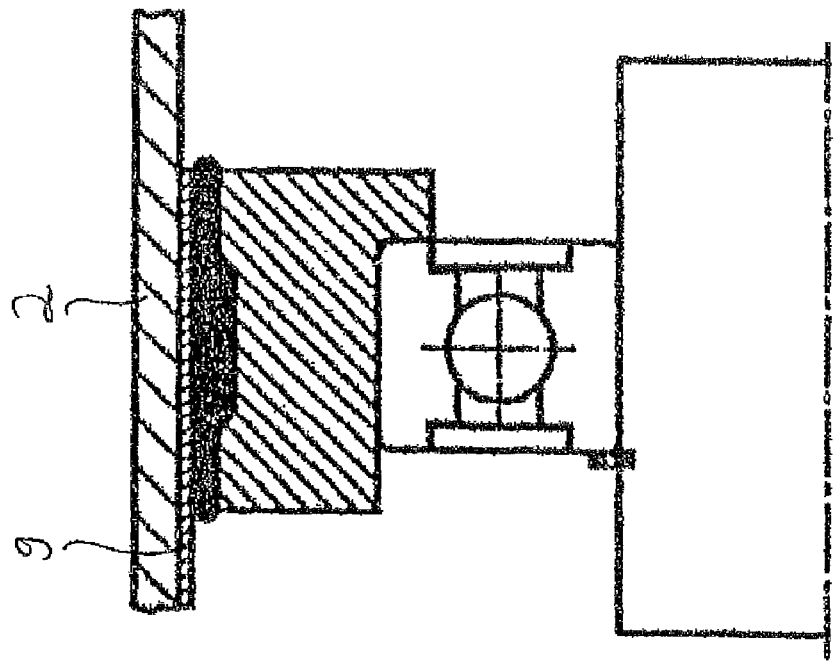
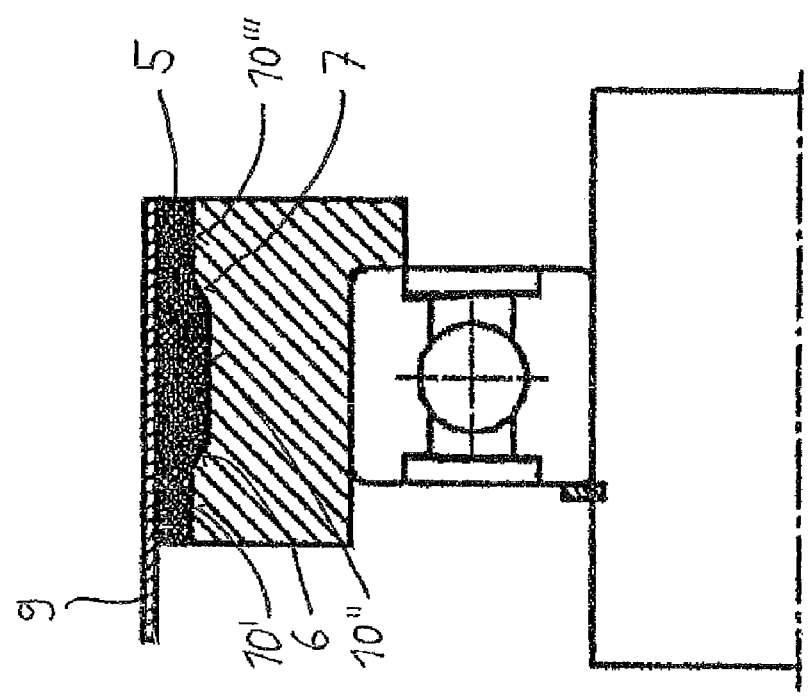
FIG. 4a
FIG. 4b

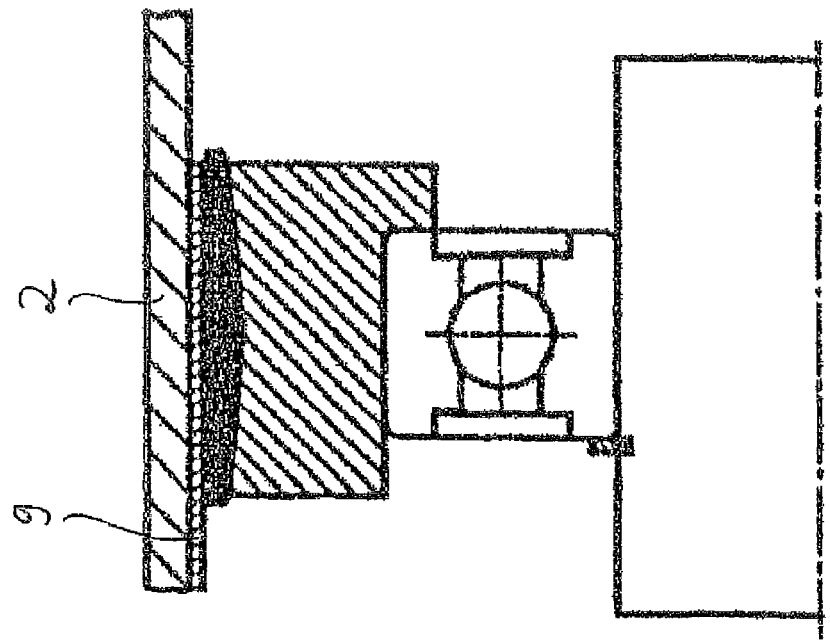
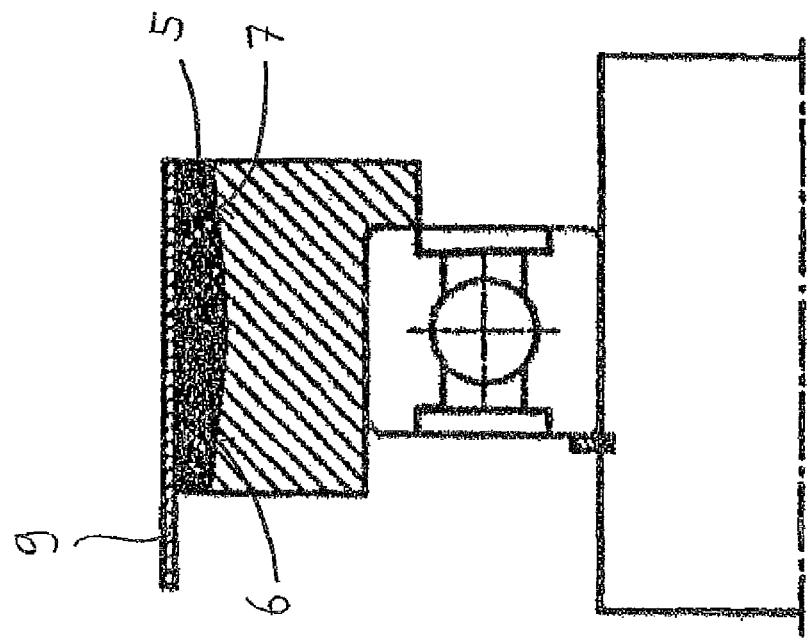
FIG. 5a
FIG. 5b

BEARING ASSEMBLY

CROSS-REFERENCE

This application claims priority to German patent application No. 10 2009 024 093.4, filed Jun. 6, 2009, the contents of which are fully incorporated herein by reference.

TECHNICAL FIELD

The invention generally relates to bearing assemblies, such as but not limited to bearing assemblies that may be utilized in support rollers or conveyor rollers. In preferred embodiments, at least one bearing rotatably supports a cylindrical roller tube and a cushioning layer is disposed, directly or indirectly, between a ring or race of the bearing and the cylindrical roller tube.

BACKGROUND ART

In some known support or conveyor rollers, a layer of cushioning material is disposed between the cylindrical roller tube and a roller bearing, which is rotatably supported on a non-rotating shaft.

For example, DE 1 738 837 U discloses a bearing assembly having a generally block-shaped elastomeric cushioning layer that has indentations formed in both of its axial end portions. A relatively high cushioning capability can be achieved with this cushioning layer. A similar design is known from GB 592 043 A.

DE 28 01 879 A1 and its family member CA 1069842 disclose a similar bearing assembly for a conveyor roller, wherein the bearing rotatably supports a support ring or sleeve via an intervening elastic layer. In certain embodiments, one axial end of the support ring expands outwardly in the radial direction and the radial-outermost portion of the support ring is welded to the cylindrical inner surface of the conveyor roller tube or casing.

Similar bearing assemblies for the cushioned bearing of a support or conveyor roller are known from AT 215 887, DE 24 00 701 A1 and U.S. Pat. No. 3,362,760.

However, the stability of the above-noted bearing assemblies may be lacking due to insufficient robustness or durability of the cushioning material. As a result, component failures can occur, when the cushioning layer is no longer capable of supporting the radial and axial forces of the conveyor or support roller.

SUMMARY

It is an object of the present teachings to disclose improved bearing designs.

In one aspect of the present teachings, bearing assemblies preferably include structural features that assist in improving the stability or durability of the material of a cushioning layer. A longer service life of the bearing assembly can be achieved in such embodiments.

In another aspect of the present teachings, at least one contact surface for the cushioning layer extends over a defined axial distance at an angle to the rotational axis of the bearing assembly. This angle is preferably between 5° and 45°, more preferably between 10° and 35°. In addition or in the alternative, the defined axial distance is preferably about 5-15% of the axial width of the structure having the contact surface(s) defined thereon.

The angled contact surface(s) may contact a radially-inner portion or surface and/or radially-outer portion or surface of the cushioning layer, as viewed in the radial cross-section of the cushioning layer.

The angled contact surface(s) may otherwise have any arbitrary outer contour. However, a substantially conical-shape design is preferred.

A support body or support ring optionally may be disposed between one ring or race, e.g., the outer race, of the bearing and the cushioning layer. In addition or in the alternative, a sleeve-shaped body can be disposed around the cushioning layer, e.g., between the cylindrical roller tube and the cushioning layer.

In another aspect of the present teachings, one angled contact surface may be defined at or on each lateral (axial) end portion of the bearing outer ring or the support body. In such an embodiment, a cylindrical contact surface is preferably defined on the outer ring or the support body between the two angled contact surfaces.

In the alternative, the two angled contact surfaces may start from the respective opposite lateral (axial) ends of the bearing outer ring or the support body and may converge at a central portion thereof. However, a cylindrical contact surface may again be defined in the central portion of the bearing outer ring or the support body between the two laterally-outer angled contact surfaces.

In the alternative, two angled contact surfaces may be disposed in a central portion of the outer bearing ring or support body and the two angled contact surfaces may connect to opposite sides of a cylindrical contact surface.

In the alternative, a single angled contact surface may be provided that extends from one lateral (axial) end of the outer bearing ring or support body to the opposite lateral (axial) end of the outer bearing ring or support body.

In another aspect of the present teachings, the cushioning layer is preferably disposed between the cylindrical roller tube and the outer ring of the bearing while being radially compressed therebetween.

In another aspect of the present teachings, the cushioning layer is disposed between the support body and the sleeve-shaped body and may be permanently connected with the support body and/or with the sleeve-shaped body. In this case, a vulcanization process may be utilized to permanently connect the cushioning layer with the support body and/or with the sleeve-shaped body. The cushioning layer and the support body and/or the sleeve-shaped body can be constructed as a pre-assembled unit, which is then press-fit in the cylindrical roller tube to assemble the conveyor roller.

The cushioning layer preferably comprises an elastomeric material, e.g., polyurethane. In addition or in the alternative, the cushioning layer may comprise a rubber material, e.g., nitrile rubber, which is also known as nitrile butadiene rubber (NBR).

An adhesive agent can be disposed between the cushioning layer and at least one radially-neighboring component.

One or both of the sleeve-shaped body and the support body is preferably comprised of metal, e.g., iron or steel plate, or steel tubing.

In another aspect of the present teachings, the sleeve-shaped body may extend in the axial direction beyond one axial end of the cylindrical roller tube. Optionally, the sleeve-shaped body may include a radially-outwardly extending collar at an axial end portion that engages said one axial end of the cylindrical roller tube.

In another aspect of the present teachings, the sleeve-shaped body can be press-fit in the cylindrical roller tube. In addition or in the alternative, the support body may include a rim that engages one axial end of the bearing outer ring or race in the axial direction.

The cylindrical roller tube is preferably formed as a pipe of constant wall thickness, more preferably a metal pipe, e.g., an iron-containing pipe. One or both of respective axial end portions of the cylindrical roller tube may be rotatably supported by a bearing assembly according to the present teachings.

In a preferred embodiment, the sleeve-shaped body and the cushioning layer, as well as optionally also the support body and/or the bearing, can be embodied as a pre-assembled unit that is installable as such. This design provides logistic advantages because the conveyor machinery can be assembled by simply press-fitting the pre-assembled unit into the cylindrical roller tube.

In preferred applications of the present teachings, the bearing assembly is utilized in a conveying device or conveying machinery designed for open pit mining. In such applications, there is a high requirement for qualitatively high-valued and light bearing assemblies that distinguish themselves with a long service life and a quiet operation.

In another aspect of the present teachings, the material of the cushioning layer is held under combined shear and compressive forces, in particular to absorb axial relative-displacement forces generated between the bearing and the cylindrical roller tube during operation. In the present embodiments, such axial displacement forces can be absorbed well by the cushioning material.

If an axial relative-displacement were to occur, the obliquely-disposed (preferably conical-shaped) contact surface(s) for the cushioning layer provide(s) the further advantage that a compression of the cushioning material will lead to a widening of the sleeve-shaped body and thus to a stable biasing of the cylindrical roller tube. As a result, a combined shear and compression force is built into the material of the cushioning layer that is advantageous for the material of the cushioning layer.

Further objects, advantages and features of the present invention will become apparent to the skilled person upon reading the following description and appended claims in view of the drawings.

BRIEF DESCRIPTION OF THE DRAWINGS

FIG. 4a shows the radial cross-section through a third representative bearing assembly without the cylindrical roller tube mounted thereon.

FIG. 4b shows the bearing assembly according to FIG. 4a with the mounted cylindrical roller tube.

FIG. 5a shows the radial cross-section through a fourth representative bearing assembly without the cylindrical roller tube mounted thereon.

FIG. 5b shows the bearing assembly according to FIG. 5a with the mounted cylindrical roller tube.

DETAILED DESCRIPTION OF THE INVENTION

Each of the additional features and teachings disclosed below may be utilized separately or in conjunction with other features and teachings to provide improved bearings and/or support/conveyor rollers, as well as methods for designing, constructing and using the same. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1:
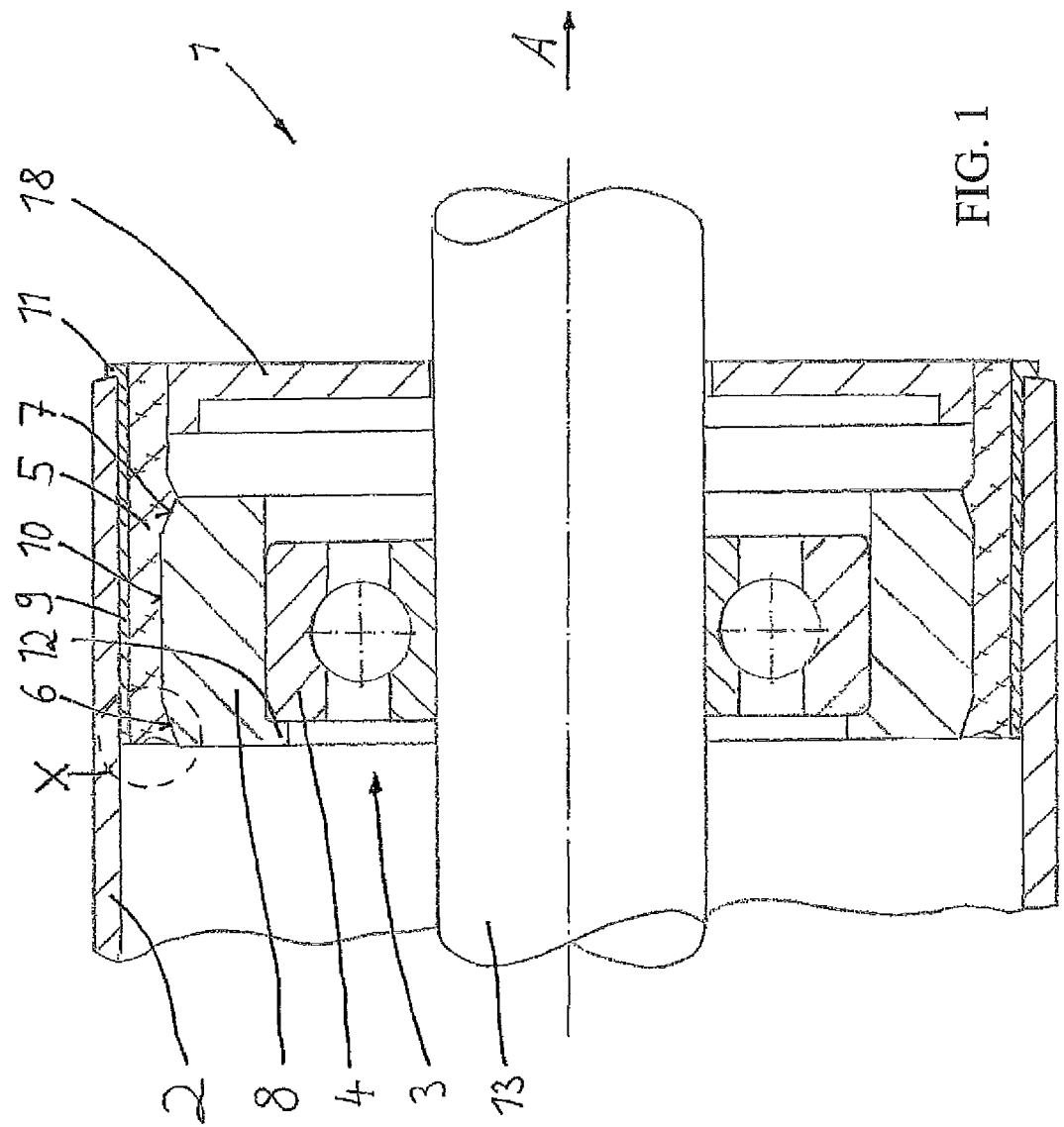
FIG. 1 shows the radial cross-section through a first representative bearing assembly that is rotatably supporting a cylindrical roller tube.

The bearing assembly 1 shown in FIG. 1 is preferably utilized to bear or rotatably support a cylindrical roller tube 2 of a conveying device. The bearing assembly 1 has a rotational axis A. The entire assembly, which is illustrated in FIG. 1, can be referred to as a support roller or conveyor roller. An inner ring or race of a deep-groove ball bearing 3 is attached to a shaft 13, and is preferably fixedly attached so that the inner ring does not rotate relative to the shaft 13. The bearing 3 is also fixed relative to the shaft 13 in the axial direction so as to prevent relative movement. The outer ring or race 4 of the deep-groove ball bearing 3 supports a support body 8 that includes a rim 12 on one side. The rim 12 engages one axial or lateral end of the outer ring 4, thereby providing an axial abutment. The bearing 3 is also fixed relative to the support body 8 in the axial direction so as to prevent relative movement. For example, the outer ring 4 may be fixedly attached to the support body 8.

The cylindrical roller tube 2 is formed as a hollow cylindrical component, e.g., as a pipe. In preferred applications, a bearing assembly 1 is disposed in each of the opposite axial end portions of the tube 2. Naturally, the tube 2 may be rotatably supported by one, two or more bearing assemblies according to the present teachings.

A sleeve-shaped body 9 is press-fit in the cylindrical roller tube 2 and contacts the inwardly-directed surface of the cylindrical roller tube 2. A cushioning layer 5, preferably made of elastomeric or rubber material, is disposed between the sleeve-shaped body 9 and the support body 8. The cushioning layer 5 is preferably a substantially hollow-cylindrical layer or tube. In preferred, non-limiting applications of the present teachings, the elastomeric or rubber material can be directly connected with the sleeve-shaped body 9 and/or with the support body 8 by an injection molding process or by a vulcanization process.

The sleeve-shaped body 9 is disposed between the inner cylindrical surface of the cylindrical roller tube 2 and the cushioning layer 5 and projects in the axial direction beyond the cylindrical roller tube 2 on one side (the right side in FIG. 1). A collar 11 extends radially outward from an axial or lateral end portion of the sleeve-shaped body 9 and preferably abuts against an axial end of the cylindrical roller tube 2. This collar 11 can also be referred to as a projection and forms a defined axial stop for the cylindrical roller tube 2. The collar 11 enables the cylindrical roller tube 2 to be fixed in position relative to the sleeve-shaped body 9 in the axial direction.

In preferred embodiments, the cushioning layer 5 is injection molded or vulcanized, which enables both radial forces and axial forces to be supported by the cushioning layer 5 and thus between the bearing 3 and the cylindrical roller tube 2.

Suitable materials for the cushioning layer include, but are not limited to, elastomeric and rubber materials. For example, polyurethane and synthetic rubber, such as nitrile rubber (NBR), are preferred. NBR can be produced by copolymerizing acrylonitrile and butadiene. The cushioning layer 5 may preferably have a Shore hardness of at least 40.

Figure 2:
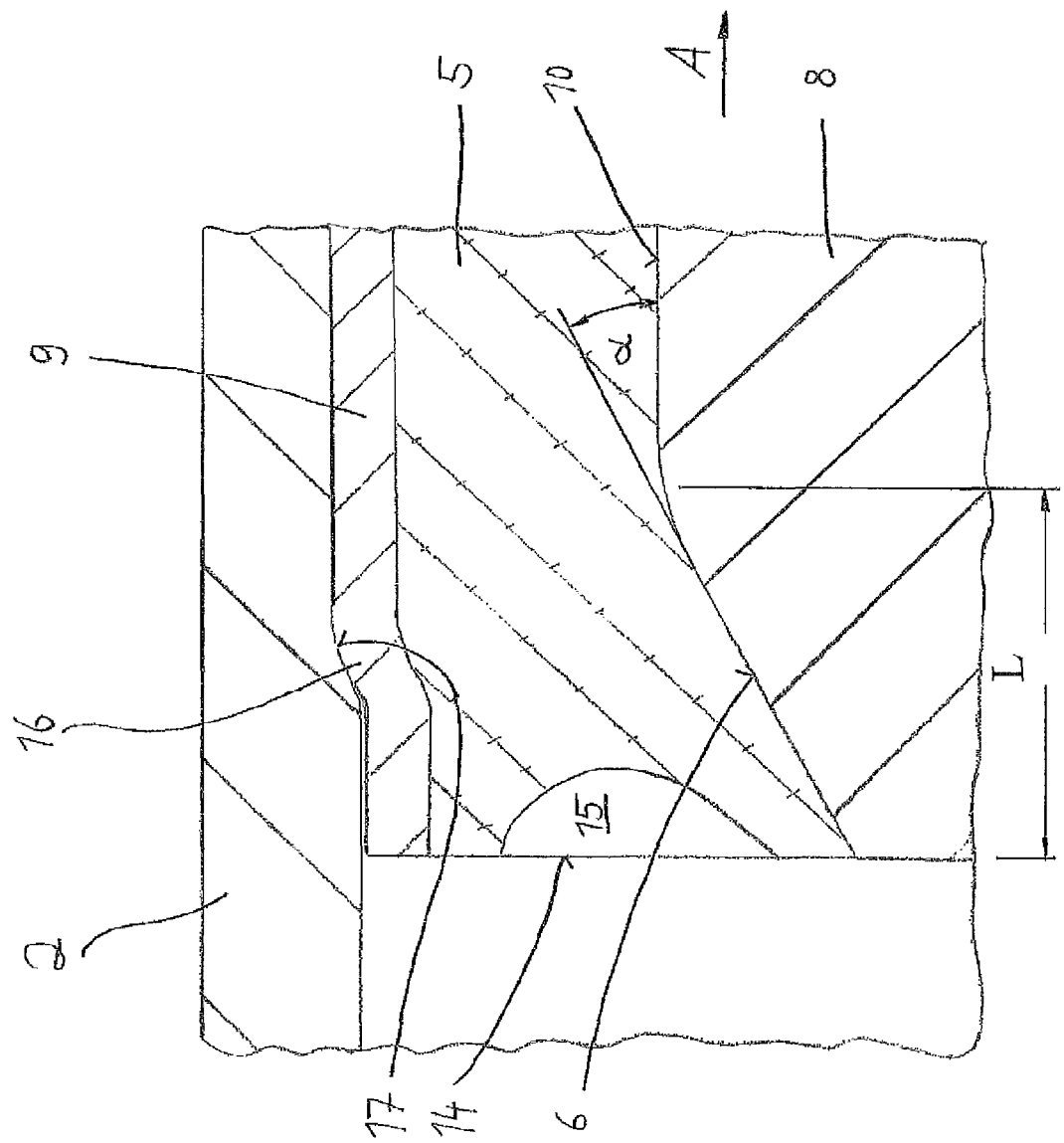
FIG. 2 shows in greater detail the area within circle "X" of FIG. 1.
Figure 3B:
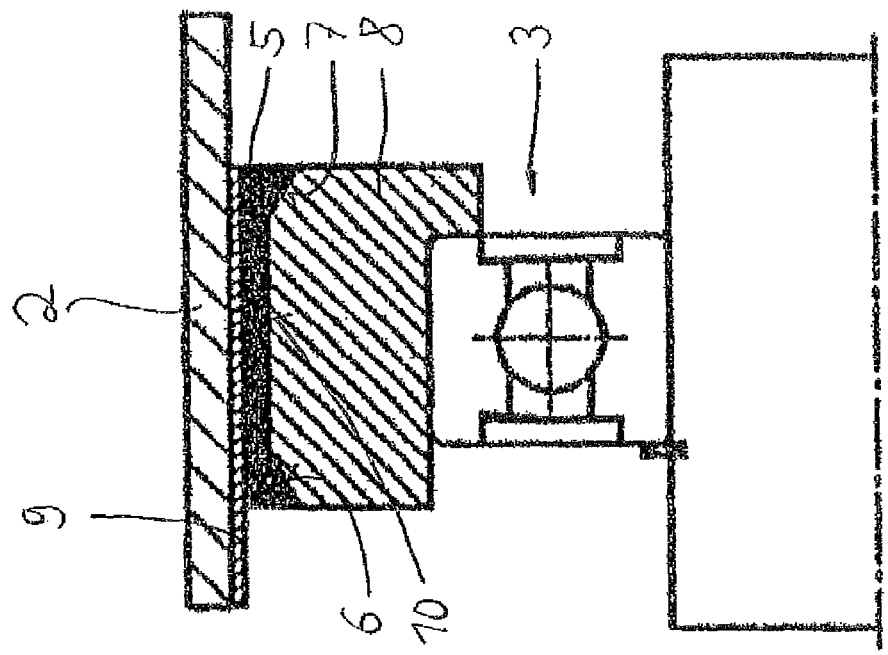
FIG. 3b shows the bearing assembly according to FIG. 3a with the mounted cylindrical roller tube.
Figure 3A:
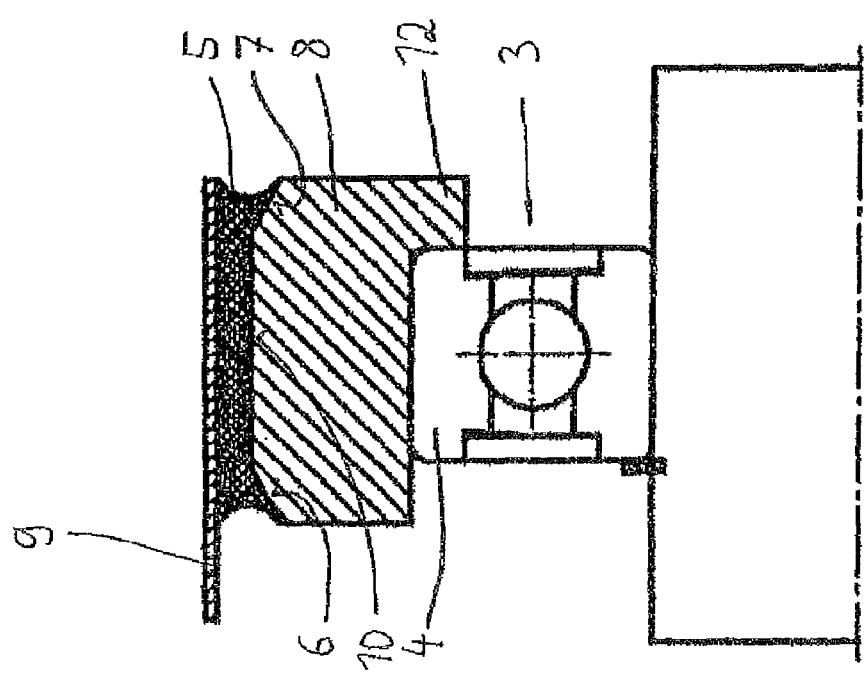
FIG. 3a shows the radial cross-section through a second representative bearing assembly without the cylindrical roller tube mounted thereon.

Referring to FIG. 2, contact surfaces 6, 7 for the cushioning layer 5 are located at or on the two lateral end portions of the support body 8. The contact surfaces 6, 7 extend around the outer circumference of the support body 8 over a defined axial distance L at an angle α to the rotational axis A of the bearing assembly 1. Thus, the contact surfaces 6, 7 are substantially conical in shape. The angle α is about 30° in the exemplary embodiment of FIGS. 1 and 2.

Generally speaking, the contact surface(s) 6, 7 for the cushioning layer 5 extend(s), e.g., adjacent the radially-inner surface and/or the radially-outer surface of the cushioning layer 5, over the defined distance L at the angle α to the rotational axis A of the bearing assembly 1. In addition or in the alternative, the at least one contact surface, which is obliquely disposed at the angle α, also can be disposed radially-outwardly in the area of the sleeve-shaped body 9 or the cylindrical roller tube 2.

In the exemplary embodiment shown in FIG. 1, the cushioning layer 5 extends in the axial direction beyond the axial width of the support body 8 (i.e. in FIG. 1 towards the right) in order to form a retaining structure for a cover 18.

In the mounted state, the material of the cushioning layer 5 may have a substantially flat lateral end surface 14 as shown in FIG. 1. However, as shown in FIG. 2, an annular groove or indention 15 may be provided on the axial end surface 14, which annular groove substantially disappears when the cushioning layer 5 outwardly deforms as a result of being press-fit into the cylindrical roller tube 2. That is, the radial compression of the cushioning layer 5 when press-fit in the tube 2 causes the material of the cushioning layer 5 to outwardly expand in the axial direction.

As shown in FIG. 2, the sleeve-shaped body 9 may have an offset or dog-leg 16 near one axial end portion. In this case, the inner circumferential surface of the cylindrical roller tube 2 preferably has a corresponding bulge 17 that contacts and/or engages the offset 16 when the sleeve-shaped body 9 is press-fit into the tube 2. These structures assist in supporting axially-directed forces during operation.

In certain preferred embodiments, the axial distance L of the contact surface 6, 7 (see FIG. 2) is between about 5% and 15% of the total width of the support body 8, as measured in the axial direction. In addition or in the alternative, the angle α is more preferably between about 10° and 35°, even more preferably between about 20° and 30°. The selection of L and α from within these ranges imparts an advantageous combined radial and axial compression to the material of the cushioning layer 5 (combined shear- and compression stresses), which leads to a long service life.

In FIGS. 3, 4, 5 and 6, four additional alternative designs according to the present teachings are provided. Again, radial cross-sections through the modified bearing assemblies are provided, albeit with less detail in order to focus on the particularly relevant differences between the respective embodiments. Features of the embodiment of FIGS. 1 and 2 that are not changed may be utilized in the embodiments of FIGS. 3-6 and are incorporated herein into the description of the embodiments of FIGS. 3-6.

FIGS. 3a, 4a, 5a and 6, respectively, depict a pre-assembled unit that is not yet installed in the cylindrical roller tube 2. After the unit illustrated in these Figures is axially pressed into the cylindrical roller tube 2, the assembly of FIGS. 3b, 4b, 5b, 6b, respectively, results. A comparison of the corresponding Figures shows that, as a consequence of the press-fitting procedure, the material of the cushioning layer is not only radially compressed, but also the axial (lateral) ends of the cushioning layer deform outwardly in the axial direction (compare the respective lateral end surface contours of the cushioning layers 5).

The embodiment of FIG. 3 has a construction that substantially corresponds to FIG. 1. Accordingly, the support body 8 has two contact surfaces 6, 7 for the cushioning layer 5 in or on its respective axial end portions. The contact surfaces 6, 7 are connected with each other via a cylindrical contact surface 10.

In the embodiment of FIG. 4, three cylindrical contact surfaces 10', 10'' and 10''' are provided. At least the middle cylindrical contact surface 10'' is radially offset relative to the other two laterally-outer cylindrical contact surfaces 10' and 10''', although all three surfaces 10', 10'' and 10''' may extend at different diameters from the rotational axis A of the bearing assembly 1. The cylindrical contact surfaces 10' and 10'' are connected with each other via a conical-shaped contact surface 6. Similarly, the cylindrical contact surfaces 10'' and 10''' are also connected with each other via a conically-shaped contact surface 7.

In the embodiment of FIG. 5, two conical-shaped contact surfaces 6 and 7 are provided and they converge approximately in the middle of the support body 8.

Figure 6B:
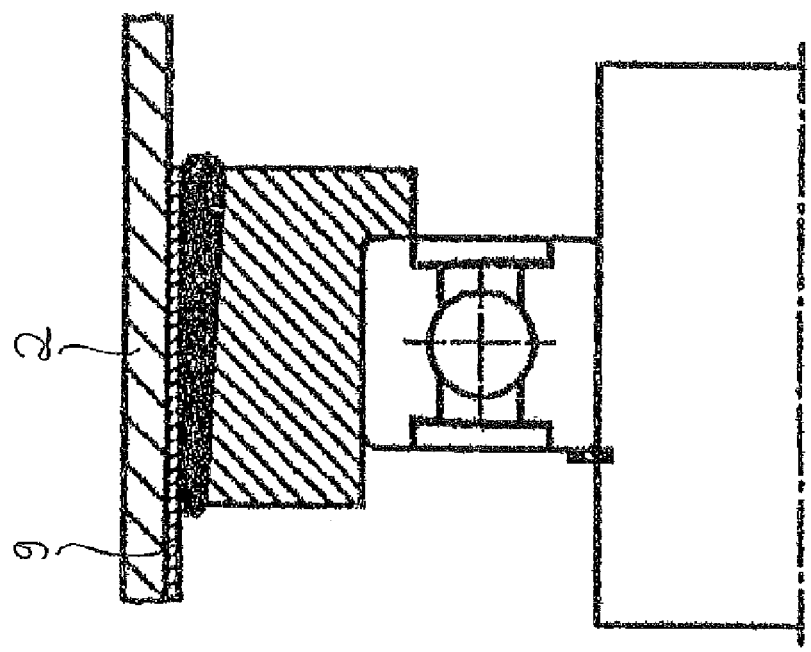
FIG. 6b shows the bearing assembly according to FIG. 6a with the mounted cylindrical roller tube.
Figure 6A:
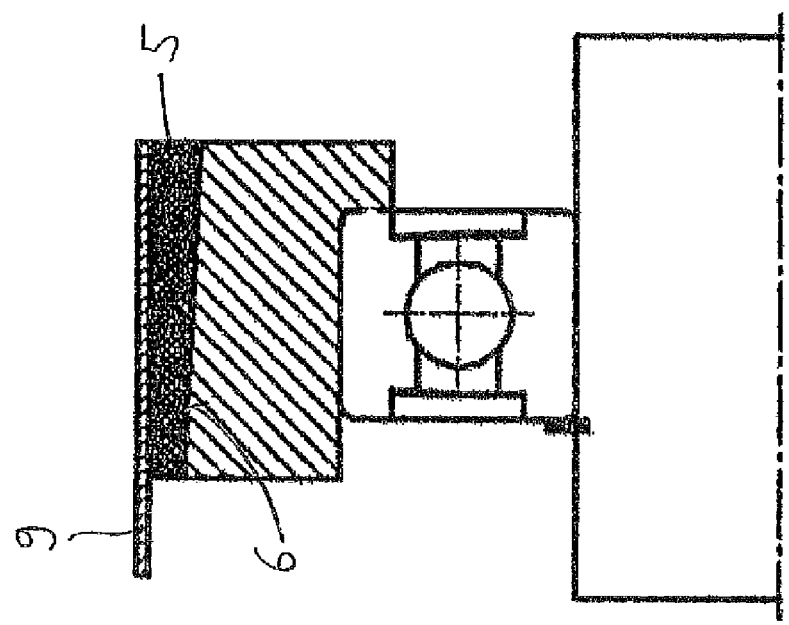
FIG. 6a shows the radial cross-section through a fifth representative bearing assembly without the cylindrical roller tube mounted thereon.

However, in the design according to FIG. 6, only one single conically-shaped surface 6 for the cushioning layer 5 is present and it extends over the entire width of the support body 8 in the axial direction.

The above-mentioned ranges for the angle α also apply to the embodiments of FIGS. 3-7. The above-mentioned ranges for the axial length L also apply to the embodiments of FIGS. 3-4.

The present embodiments may be modified in various ways. For example, the cushioning layer 5 may extend continuously or discontinuously around the circumference of the bearing 3. That is, the cushioning layer 5 may be a single annular piece or may comprise a plurality of discrete segments that are discontinuous in the circumferential direction.

Further, the cushioning layer 5 may be a generally solid material or may include through-holes, slots and/or gaps therein.

Although the preferred embodiments provide a support body 8 that is fixedly attached to the outer ring 4 of the bearing 3, it is possible to omit the support body 8. In this case, the cushioning layer 5 may directly contact or be attached to the outer ring 4. At least the radially-outer surface of the outer ring 4 may be enlarged in such embodiments to provide a larger surface area in the axial direction for contacting the cushioning material 5.

Although balls are preferred roller bodies for the bearing 3, other types of roller bodies may be utilized with the present teachings, such as cylindrical roller bodies, tapered roller bodies, spherical roller bodies, etc.

Reference Number List
1 Bearing assembly
2 Cylindrical roller tube
3 Bearing (roller bearing)
4 Bearing ring
5 Cushioning layer
6 Contact surface
7 Contact surface
8 Support body
9 Sleeve-shaped body
10 Cylindrical contact surface
10' Cylindrical contact surface
10" Cylindrical contact surface
10'" Cylindrical contact surface
11 Collar
12 Rim
13 Shaft
14 Axial end surface
15 Indentation
16 Offset
17 Bulge
18 Cover
L axial distance
α Angle
A Rotational axis of the bearing assembly

The invention claimed is:

1. A bearing assembly for a conveyer roller comprising
at least one bearing configured to rotatably support a cylindrical roller tube, the at least one bearing having an inner ring, an outer ring and a plurality of roller bodies disposed between the inner and outer rings,
a cushioning layer disposed around the outer ring, wherein at least one contact surface for the cushioning layer, which contact surface is adjacent a radially-inner or a radially-outer portion of the cushioning layer, extends over a defined axial distance at a non-zero angle to the rotational axis of the bearing assembly,
a support body disposed between the outer ring and the cushioning layer, and
a sleeve-shaped body disposed around the cushioning layer, wherein the cushioning layer is permanently connected to at least one of the support body and the sleeve-shaped body.

2. A bearing assembly according to claim 1, wherein the non-zero angle is between about 5° and 45°.

3. A bearing assembly according to claim 2, wherein the non-zero angle is between about 10° and 35°.

4. A bearing assembly according to claim 1, wherein at least a portion of the at least one contact surface is conical-shaped.

5. A bearing assembly according to claim 1, wherein the support body includes a radially-outwardly extending rim that contacts one axial end of the outer ring.

6. A bearing assembly according to claim 1, wherein the sleeve-shaped body is configured to project beyond the cylindrical roller tube in the axial direction and includes a radially-outwardly extending collar that is configured to contact an axial end portion of the cylindrical roller tube.

7. A bearing assembly according to claim 1, wherein the at least one contact surface is defined on the support body and has a length in the axial direction of the bearing assembly that is between about 5% and 15% of the width of the support body in the axial direction.

8. A bearing assembly according to claim 7, wherein the non-zero angle is between about 10° and 35°.

9. A bearing assembly according to claim 1, wherein the at least one contact surface comprises first and second contact surfaces defined at or adjacent lateral end portions of one of the outer ring and a support body disposed around the outer ring.

10. A bearing assembly according to claim 9, wherein a cylindrical contact surface for the cushioning material is defined between the first and second contact surfaces.

11. A bearing assembly according to claim 1, wherein the at least one contact surface comprises first and second contact surfaces that respectively start from opposite lateral end portions of at least one of the outer ring and a support body disposed around the outer ring and converge adjacent to or at a middle portion the outer ring or the support body.

12. A bearing assembly according to claim 1, wherein the at least one contact surface comprises first and second angled contact surfaces, and wherein first, second and third cylindrical contact surfaces for the cushioning material are present, the first angled contact surface connecting the first and second cylindrical contact surfaces and the second angled contact surface connecting the second and third cylindrical contact surfaces.

13. A bearing assembly according to claim 1, wherein the cushioning layer comprises an elastomeric material.

14. A bearing assembly according to claim 13, wherein the cushioning layer comprises polyurethane.

15. A bearing assembly according to claim 1, wherein the cushioning layer comprises a rubber material.

16. A bearing assembly according to claim 15, wherein the cushioning layer comprises nitrile rubber.

17. A bearing assembly according to claim 1, further comprising:
the support body disposed between the outer ring and the cushioning layer, the support body including a radially-outwardly extending rim that contacts one axial end of the outer ring, wherein the at least one contact surface is defined on a radially-outer surface of the support body, has a length in the axial direction of the bearing assembly that is between about 5% and 15% of the width of the support body in the axial direction and extends at an angle of between about 10° and 35° to the rotational axis of the bearing assembly, and wherein at least a portion of the at least one contact surface is conical-shaped, and
the sleeve-shaped body disposed around the cushioning layer, the sleeve-shaped body being configured to project beyond the cylindrical roller tube in the axial direction and having a radially-outwardly extending collar that is configured to contact an axial end portion of the cylindrical roller tube,
wherein the cushioning layer comprises at least one of an elastomeric material and a rubber material and the cushioning layer is permanently connected to at least one of the support body and the sleeve-shaped body.

18. A conveyor roller comprising: a cylindrical roller tube having a uniform wall thickness,
a first bearing assembly according to claim 17 being press-fit within a first axial end of the cylindrical roller tube,
a second bearing assembly according to claim 17 being press-fit within a second axial end of the cylindrical roller tube,
wherein the cushioning layer of each of the first and second bearing assemblies is radially compressed between the cylindrical roller tube and the outer ring of the respective bearing assembly.

* * * * *